(12) United States Patent
Koh et al.

(10) Patent No.: US 9,164,788 B2
(45) Date of Patent: Oct. 20, 2015

(54) APPARATUS AND METHOD FOR AUTOMATIC PARA-VIRTUALIZATION OF OS KERNEL

(75) Inventors: Kwang-Won Koh, Daejeon-si (KR); Kang-Ho Kim, Daejeon-si (KR); Soo-Cheol Oh, Daejeon-si (KR); Chang-Won Ahn, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 291 days.

(21) Appl. No.: 13/598,007

(22) Filed: Aug. 29, 2012

(65) Prior Publication Data

US 2013/0139157 A1 May 30, 2013

(30) Foreign Application Priority Data

Nov. 30, 2011 (KR) ........................ 10-2011-0127104

(51) Int. Cl.
*G06F 9/455* (2006.01)

(52) U.S. Cl.
CPC .......... *G06F 9/4555* (2013.01); *G06F 9/45533* (2013.01)

(58) Field of Classification Search
None
See application file for complete search history.

(56) References Cited

U.S. PATENT DOCUMENTS 6,622,300 B1 * 9/2003 Krishnaswamy et al. .... 717/130
2011/0219373 A1 9/2011 Nam et al.

FOREIGN PATENT DOCUMENTS

KR 10-2011-0099617 9/2011

OTHER PUBLICATIONS

François Armand et al., "Automating the Porting of Linux to the VirtualLogix Hypervisor using Semantics Patches", pp. 1-8.

* cited by examiner

*Primary Examiner* — Qing Wu
(74) *Attorney, Agent, or Firm* — Staas & Halsey LLP

(57) ABSTRACT

An automatic para-virtualization apparatus of an OS kernel is provided. The automatic para-virtualization apparatus includes a kernel profiler that detects profile information from a native OS kernel, and a virtualization unit that automatically generates a para-virtualized OS kernel that operates on a para-virtualization virtual machine monitor by combining the native OS kernel and the profile information.

13 Claims, 5 Drawing Sheets

FIG. 4

| PROFILE INFORMATION | | | | |
|---|---|---|---|---|
| Address | Inst. Type | Addressing Mode | Emulation Function | ... |
| Address | Inst. Type | Addressing Mode | Emulation Function | ... |
| Address | Inst. Type | Addressing Mode | Emulation Function | ... |
| Address | Inst. Type | Addressing Mode | Emulation Function | ... |
| Address | Inst. Type | Addressing Mode | Emulation Function | ... |
| Address | Inst. Type | Addressing Mode | Emulation Function | ... |

⋮

| Address | Inst. Type | Addressing Mode | Emulation Function | ... |
|---|---|---|---|---|

APPARATUS AND METHOD FOR AUTOMATIC PARA-VIRTUALIZATION OF OS KERNEL

CROSS-REFERENCE TO RELATED APPLICATION

This application claims the benefit under 35 U.S.C. §119 (a) of Korean Patent Application No. 10-2011-0127104, filed on Nov. 30, 2011, the entire disclosure of which is incorporated herein by reference for all purposes.

BACKGROUND

1. Field

The following description relates to virtualization technology, and more particularly, to an apparatus and method for virtualizing an OS (operating system) kernel which is not virtualized.

2. Description of the Related Art

An OS (operating system) is an aggregate of programs providing an interface so that a user can more easily use hardware of a computer device such as a personal computer (PC), and it manages resources such as processors, storage devices, input and output devices, communication devices, data, and the like.

Meanwhile, users may install and use a plurality of OSs in a single system in accordance with purposes or needs. For example, Windows XP and LINUX are respectively installed in two regions which are logically divided in a single system storage medium, application programs supported by each of the OSs are installed on the corresponding OS and then booted into the OS desired by the computer device to thereby perform operations in the corresponding OS.

The way in which the plurality of OSs are installed to be booted into an OS selected by a user is referred to as multi-booting. However, in multi-booting, to convert from a predetermined OS to another OS, the computer device inconveniently has to be re-booted.

To overcome this problem, in the related art, virtualization technology that drives a plurality of OSs on a single platform has been proposed. More specifically, the virtualization technology in which a virtualization layer is formed on a host OS, or a virtual machine monitor or a hypervisor that directly provides the virtualization layer is provided, so that a plurality of logical virtual machines are generated on the virtualization layer. A guest operating program is installed in each of the plurality of virtual machines, and a program supported by the corresponding OS may be installed on each of guest OSs.

Examples of the virtualization technology are full-virtualization that does not require correction of the guest OS, and para-virtualization that requires correction of the guest OS so as to enhance performance, a minimum value, security, and the like, compared to an existing guest OS.

Full-virtualization performs virtualization by providing, to an OS kernel, an illusion that an interface and an environment provided in a system are completely provided. Here, it is very difficult to perform full-virtualization without access permission to a source code of the OS kernel, and a maintenance operation that is routinely performed each times there is a change in a kernel code requires additional development and testing even when access to the source code is permitted.

Para-virtualization involves recognizing virtualization by an OS regardless of hardware, and thus the OS is operated using an interface defined by a virtual machine monitor which is different from an existing hardware interface, and thereby the virtual machine monitor emulates a hardware interface, and monitoring for a code of the OS kernel is not required. As a result, there is less of a performance reduction due to the virtualization compared to full-virtualization, and a size of the virtual machine monitor is also reduced.

However, in the related art, porting in which the OS kernel performing a hardware operation is operated in the virtual machine monitor is required.

When virtualizing a system in the virtual machine monitor, the above-described full-virtualization is conveniently used and has low maintenance costs, but is sensitive to a performance or a function provided by hardware, and therefore it is difficult to apply full-virtualization in an environment sensitive to hardware resources.

However, since there is little use of hardware when performing para-virtualization, para-virtualization may be used in environments sensitive to hardware resources.

SUMMARY

The following description relates to a para-virtualization apparatus and method that convert, to be operable, an OS kernel that is not virtualized on a machine monitor based on para-virtualization technology.

The following description relates to a para-virtualization apparatus and method which automatically convert an OS kernel on a machine monitor based on para-virtualization technology.

In one general aspect, there is provided an automatic para-virtualization apparatus of an OS kernel, including: a kernel profiler that detects profile information from a native OS kernel; and a virtualization unit that generates a para-virtualized OS kernel that operates on a para-virtualization virtual machine monitor by combining the native OS kernel and the profile information.

In another general aspect, there is provided a method of para-virtualizing an OS kernel by a para-virtualization apparatus so that a native OS operates on a para-virtualization virtual machine monitor, including: detecting profile information from a native OS kernel; and generating a para-virtualized OS kernel that operates on the virtual machine monitor by combining the native OS kernel and the profile information.

Other features and aspects will be apparent from the following detailed description, the drawings, and the claims.

BRIEF DESCRIPTION OF THE DRAWINGS

FIG. 4 is a diagram illustrating an example of profile information according to a preferred embodiment of the present invention.

Figure 1:
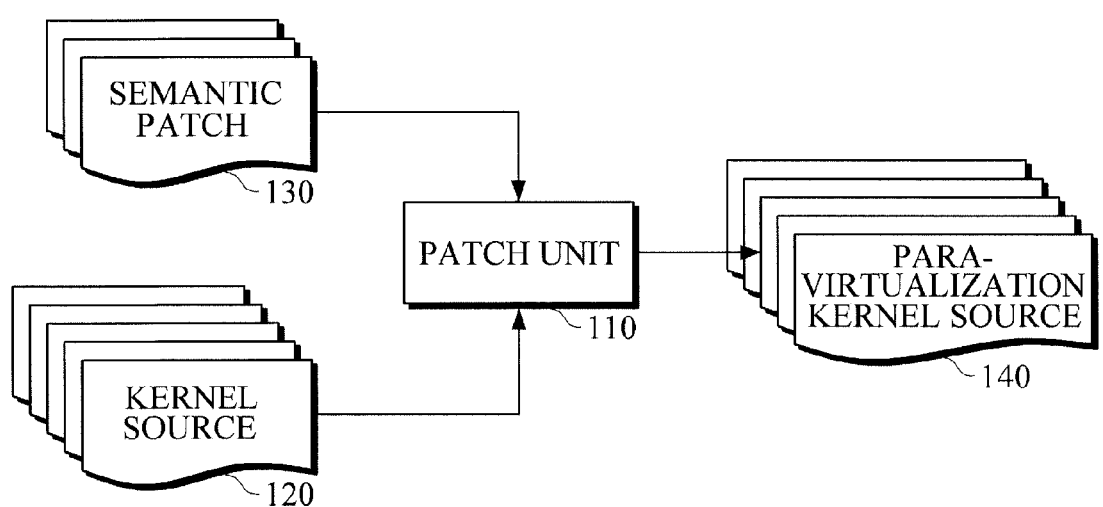
FIG. 1 is a configuration diagram illustrating a semantic patch system for para-virtualization.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

Some companies providing para-virtualization technology overcome differences between various versions of an OS by applying a semantic patch that manages OS source patches.

FIG. 1 is a configuration diagram illustrating a semantic patch system for para-virtualization.

Referring to FIG. 1, in the semantic patch system, a patch unit 110 generally patches kernel sources 120 using a semantic patch 130 to thereby generate a para-virtualization kernel source 140. However, the kernel sources 120, as precompiled data, can only be applied to a single OS, and are difficult to apply to the OS when many changes in the single OS kernel are generated. Also, the semantic patch system has a problem in that the semantic patches 130 for para-virtualization have to be manually created one by one.

To overcome these problems, the present invention may adaptively cope with changes in the OS kernel by para-virtualizing a compiled binary kernel, extracting profile information from the OS kernel, and performing virtualization using the extracted profile information, to thereby automate the virtualization.

Figure 2:
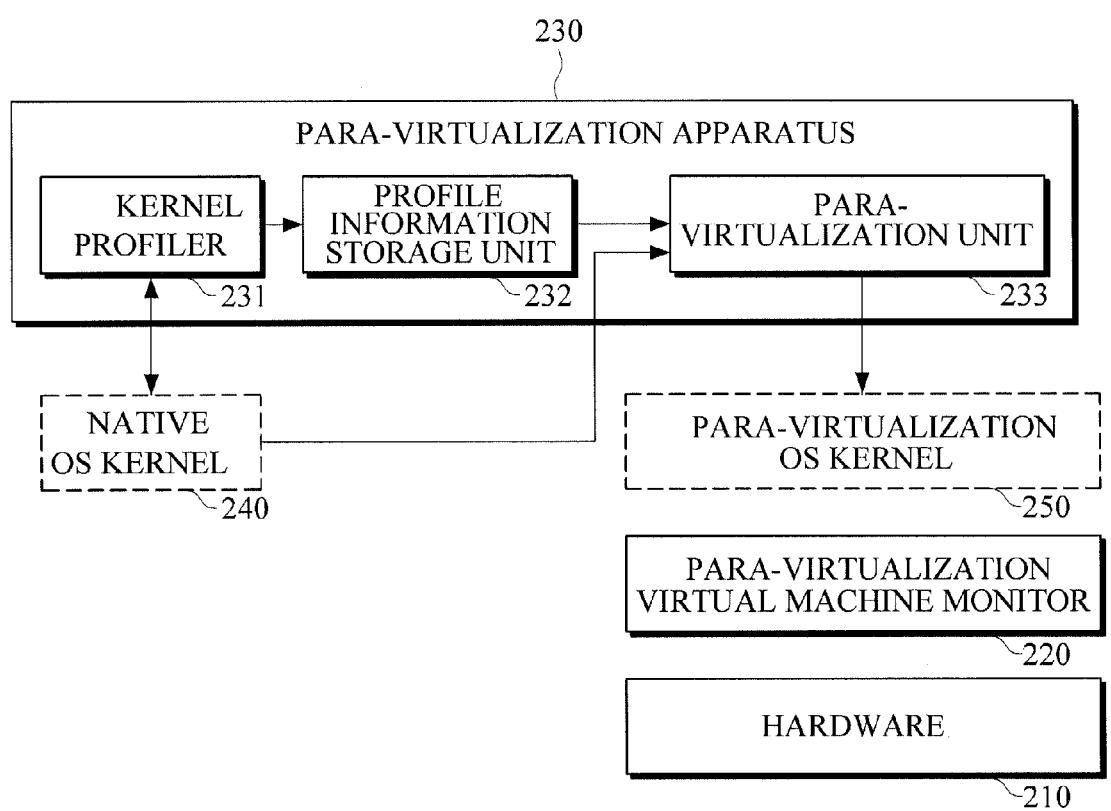
FIG. 2 is a configuration diagram illustrating an automatic para-virtualization apparatus of an OS kernel according to a preferred embodiment of the present invention.

FIG. 2 is a configuration diagram illustrating an automatic para-virtualization apparatus of an OS kernel according to a preferred embodiment of the present invention.

Referring to FIG. 2, hardware 210 is a practical hardware device including at least one central processing unit, a memory, an input/output device, a disk and memory management unit, and the like.

A para-virtualization virtual machine monitor (VMM) 220 virtualizes the hardware 210, so that a plurality of OSs can simultaneously use the virtualized hardware 210. That is, a single physical system resource may be used as a plurality of virtualization system resources.

The para-virtualization VMM 220 may be implemented by virtualization software, which appropriately converts instructions to be performed in a virtual layer to enable a guest OS to use the instructions. This virtualization software is referred to as a hypervisor.

A para-virtualization apparatus 230 according to a preferred embodiment of the present invention includes a kernel profiler 231, a profile information storage unit 232, and a para-virtualization unit 233.

The kernel profiler 231 detects profile information from a native OS kernel 240 and stores the detected profile information in the profile information storage unit 232.

Figure 3:
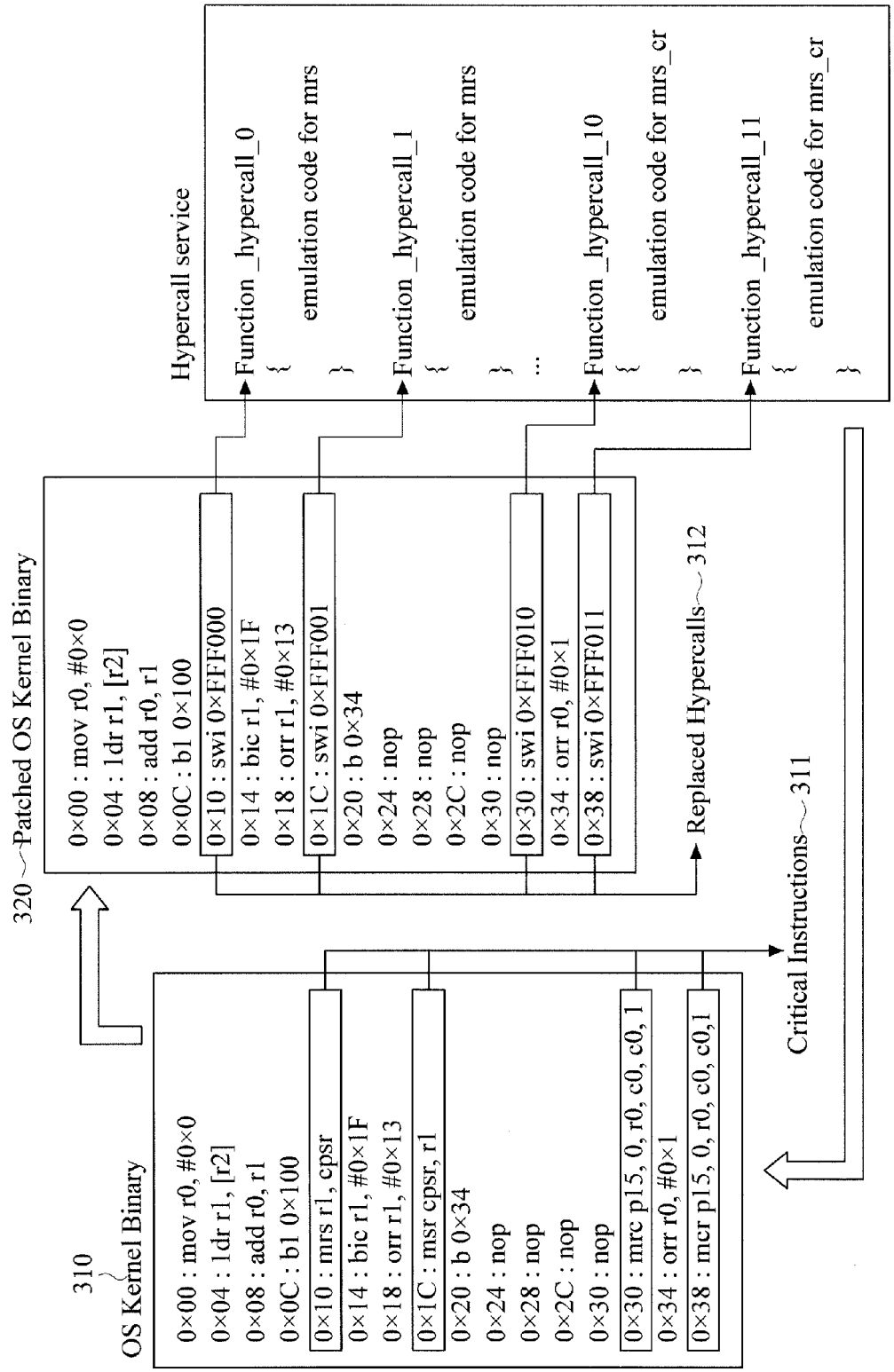
FIG. 3 is a diagram illustrating an example of an OS kernel code of para-virtualizing an OS kernel according to a preferred embodiment of the present invention.

Here, the native OS kernel 240 is a compiled binary code that is different from the kernel source 120 shown in FIG. 1 and, for example, is an OS kernel binary 310 shown in FIG. 3.

Therefore, an environment in which the OS kernel directly operates on hardware is provided, and the OS kernel does not recognize an environment in which the kernel profiler 231 is involved but simply considers an environment in which the OS kernel operates on the hardware.

FIG. 3 is a diagram illustrating an example of para-virtualizing an OS kernel according to a preferred embodiment of the present invention.

Referring to FIG. 3, specifically, the kernel profiler 231 operates the native OS on the hardware 210 and monitors instructions used by the kernel code.

The kernel profiler 231 retrieves critical instructions and instructions sensitive to virtualization such as correction to a page table, or the like, from monitored code.

That is, as shown in FIG. 3, critical instructions 311 are retrieved from the OS kernel binary 310 to thereby generate profile information.

FIG. 4 is a diagram illustrating an example of profile information according to a preferred embodiment of the present invention.

The kernel profiler 231 collects profile information such as an address of an instruction detected from the native OS kernel 240, a type of a corresponding instruction, an addressing mode, an emulation function with respect to a corresponding instruction, and the like, to thereby generate the profile information shown in FIG. 4.

Next, the para-virtualization unit 233 combines the native OS kernel 240 and the profile information stored in the profiling storage unit 232 to thereby automatically generate a para-virtualized OS kernel 250 which can operate in the para-virtualization VMM 220.

Referring to FIG. 4, using the profile information of the corresponding OS kernel with respect to the hardware obtained through the kernel profiler 231, the para-virtualization unit 233 performs a direct patch with respect to the native OS kernel 240. Here, the kernel does not directly perform a critical instruction but rather performs a conversion in order to perform hypercalls 312 to the VMM 220, so that an emulation code for the corresponding critical instruction is performed by the VMM 220.

As described above, according to the embodiments of the present invention, the OS kernel is automatically converted into a kernel that operates on the VMM supporting para-virtualization. Therefore, a virtualization system that uses resources efficiently can be configured at low cost.

Figure 5:
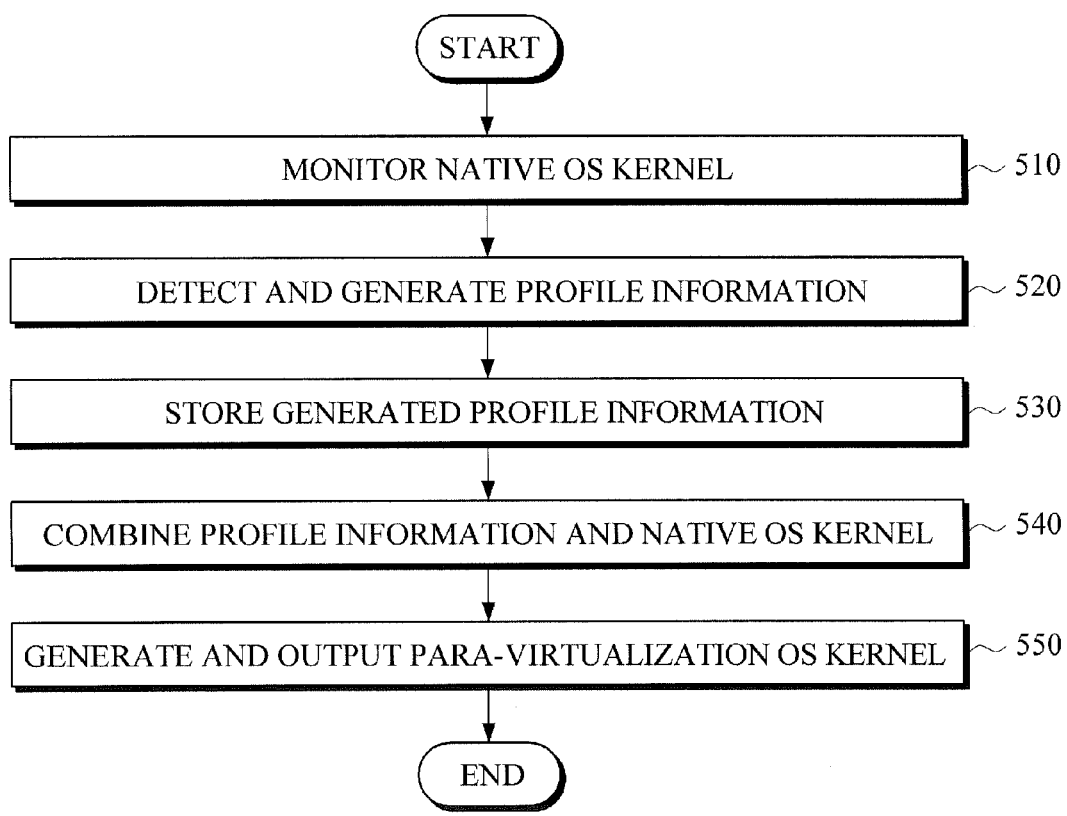
FIG. 5 is a flowchart illustrating a method of para-virtualizing an OS kernel according to a preferred embodiment of the present invention.

FIG. 5 is a flowchart illustrating a method of automatically para-virtualizing an OS kernel according to a preferred embodiment of the present invention.

Referring to FIG. 5, in step 510, a para-virtualization apparatus executes a native OS kernel on hardware to monitor the executed OS kernel.

In step 520, the para-virtualization apparatus detects profile information. That is, the para-virtualization apparatus detects information including critical instructions from a kernel binary of the monitored native OS kernel.

In step 530, the para-virtualization apparatus stores the detected profile information.

Next, in step 540, the para-virtualization apparatus combines the stored profile information and the native OS kernel. That is, the para-virtualization apparatus performs a direct patch with respect to the native OS kernel using the profile information.

Here, the kernel does not directly perform a critical instruction but rather performs a conversion in order to perform hypercalls 312 to the VMM 220, so that an emulation code for the corresponding critical instruction is performed by the VMM 220.

Next, in step 550, the para-virtualization apparatus generates a para-virtualization OS kernel and outputs the generated para-virtualization OS kernel to operate on the VMM.

As described above, when para-virtualization technology is introduced for some purpose such as to minimize a performance reduction generated by introducing virtualization technology in an environment sensitive to computing resources, costs of development, operation, and maintenance of a para-virtualization system can be minimized by rapidly converting an OS kernel which is not virtualized into a kernel supporting para-virtualization, regardless of a type and version of an OS.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An automatic para-virtualization system, comprising:
   at least one hardware device; and
   an automatic para-virtualization apparatus of an OS kernel comprising:
      a kernel profiler that executes, using at least one processor of the at least one hardware device, a native OS kernel and detects profile information of the native OS kernel by monitoring the execution of the native OS kernel; and
      a para-virtualization unit that generates a para-virtualized OS kernel that operates on a para-virtualization virtual machine monitor by combining the native OS kernel and the profile information.

2. The automatic para-virtualization system according to claim 1, wherein the automatic para-virtualization apparatus further comprises:
   a profile information storage unit that stores the profile information.

3. The automatic para-virtualization system according to claim 1, wherein the native OS kernel is compiled binary code.

4. The automatic para-virtualization system according to claim 1, wherein the kernel profiler detects profile information by monitoring instructions used by a kernel code of the native OS that operates on hardware.

5. The automatic para-virtualization system according to claim 4, wherein the instructions are sensitive to virtualization including correction to a critical instruction or a page table.

6. The automatic para-virtualization system according to claim 4, wherein the profile information includes at least one of an address of an instruction, a type of the corresponding instruction, an addressing mode, and an emulation function for the corresponding instruction.

7. The automatic para-virtualization system according to claim 1, wherein the para-virtualization unit performs a direct patch with respect to the native OS kernel using the profile information.

8. The automatic para-virtualization system according to claim 1, wherein the para-virtualization unit changes the OS kernel so that the OS kernel performs hypercalls to the virtual machine monitor.

9. A method of para-virtualizing an OS kernel by a para-virtualization apparatus so that a native OS operates on a para-virtualization virtual machine monitor, comprising:
   detecting profile information from a native OS kernel by monitoring an execution of the native OS kernel; and
   generating a para-virtualized OS kernel that operates on the virtual machine monitor by combining the native OS kernel and the profile information.

10. The method of para-virtualizing the OS kernel by a para-virtualization apparatus according to claim 9, further comprising:
   storing the profile information.

11. The method of para-virtualizing the OS kernel by a para-virtualization apparatus according to claim 10, wherein the step of detecting involves detecting profile information by monitoring instructions used by a kernel code of the native OS that operates on hardware.

12. The method of para-virtualizing the OS kernel by para-virtualization apparatus according to claim 10, wherein the step of generating involves performing a direct patch with respect to the native OS kernel using the profile information.

13. The method of para-virtualizing the OS kernel by para-virtualization apparatus according to claim 10, wherein the step of generating involves converting so that the OS kernel performs hypercalls to the virtual machine monitor.

* * * * *